United States Patent
Chan et al.

(10) Patent No.: US 7,979,739 B2
(45) Date of Patent: Jul. 12, 2011

(54) SYSTEMS AND METHODS FOR MANAGING A REDUNDANT MANAGEMENT MODULE

(75) Inventors: Kum Cheong Adam Chan, Singapore (SG); Chee Cheng Jeffrey Liang, Singapore (SG); Boon Siang Choo, Singapore (SG); Dale Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 12/195,440

(22) Filed: Aug. 21, 2008

(65) Prior Publication Data
US 2009/0125752 A1   May 14, 2009

Related U.S. Application Data

(60) Provisional application No. 60/987,489, filed on Nov. 13, 2007.

(51) Int. Cl.
*G06F 11/00* (2006.01)

(52) U.S. Cl. .............................. 714/12; 714/13; 714/725

(58) Field of Classification Search .................... None
See application file for complete search history.

(56) References Cited

U.S. PATENT DOCUMENTS

| | | | |
|---|---|---|---|
| 6,845,467 B1 * | 1/2005 | Ditner et al. ................... 714/11 |
| 6,993,650 B2 | 1/2006 | Landers, Jr. et al. |
| 7,103,641 B2 | 9/2006 | Brannock |
| 7,428,659 B2 * | 9/2008 | Nagano et al. ................ 714/12 |
| 7,673,172 B2 * | 3/2010 | Fairhurst et al. ............... 714/9 |
| 7,689,820 B2 * | 3/2010 | Pierce et al. ................... 713/2 |
| 2006/0133332 A1 | 6/2006 | Achanta |
| 2007/0025306 A1 | 2/2007 | Cox et al. |
| 2010/0174895 A1 * | 7/2010 | Pierce et al. ................... 713/2 |

* cited by examiner

*Primary Examiner* — Christopher S McCarthy (57) ABSTRACT

Systems and methods for managing a redundant management module are provided. In this regard, a representative system, among others, includes first and second management modules that are configured to manage a computing device; and a programmable logic device that is configured to: instruct the first management module to manage the computing device responsive to detecting that the first management module is ready to manage the computing device, and instruct the second management module to manage the computing device responsive to detecting that the first management module failed to manage the computing device.

19 Claims, 4 Drawing Sheets

SYSTEMS AND METHODS FOR MANAGING A REDUNDANT MANAGEMENT MODULE

CROSS-REFERENCE TO RELATED APPLICATIONS

This Utility Patent Application is based on and claims the benefit of U.S. Provisional Application No. 60/987,489, filed on Nov. 13, 2007, the contents of which are hereby incorporated by reference in their entirety.

TECHNICAL FIELD

The present disclosure relates to computing devices, and more particularly, the disclosure relates to systems and methods for managing a redundant management module.

BACKGROUND

In a computing device that needs to exhibit high-reliability, such as a core network switch, a redundant management module is typically designed to be fail proof. To achieve that, a secondary management module should be present and ready to immediately take control of the system and continue the operation of the failing management module. However, the challenge for engineers is to come up with a reliable way to manage the redundant management module.

SUMMARY

Systems and methods for managing a redundant management module are provided. In this regard, a representative system, among others, includes first and second management modules that are configured to manage a computing device; and a programmable logic device that is configured to: instruct the first management module to manage the computing device responsive to detecting that the first management module is ready to manage the computing device, and instruct the second management module to manage the computing device responsive to detecting that the first management module failed to manage the computing device.

A representative method, among others, for managing a redundant management module includes the steps of: booting up first and second management modules; instructing the first management module by a programmable logic device to manage the computing device responsive to detecting that the first management module is ready to manage the computing device; and instructing the second management module by the programmable logic device to manage the computing device responsive to detecting that the first management module failed to manage the computing device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the example systems have been described, examples of operation of the systems are provided to explain the manners in which managing a redundant management module can be achieved.

Figure 1:
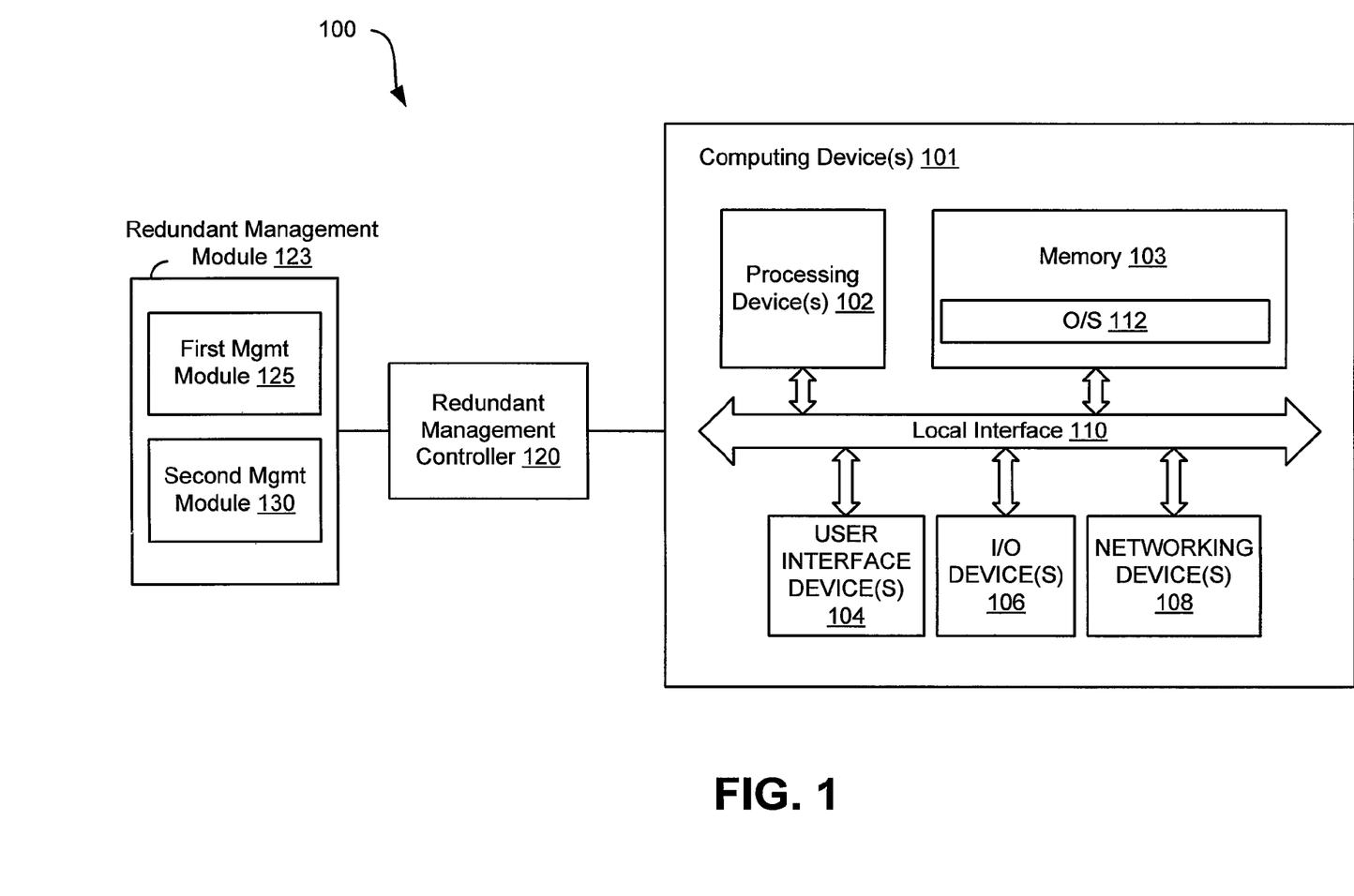
FIG. 1 is a block diagram that illustrates an embodiment of a system through which a redundant management module can be managed.

Referring now in more detail to the figures in which like reference numerals identify corresponding parts, FIG. 1 is a block diagram that illustrates an embodiment of a system 100 through which a redundant management module can be managed. As indicated in FIG. 1, the system 100 generally comprises one or more user computing devices 101 that are electrical coupled to a redundant management controller 120, which is electrically coupled to the redundant management module 123. The redundant management module 123 includes a plurality of management modules, for example, a first management module 125 and a second management module 130, such as that shown in FIG. 1. In general, the redundant management module 123 handles the policies and mechanisms that allow the computing device to perform its functionalities and the redundant management controller 120 manages the redundant management module 123. The redundant management controller 120 and redundant management module 123 are further described in relation to FIGS. 2-4.

The computing device 101 can, for instance, be, but is not limited to, a mobile station, base station, network switch, gateway, and server. If the computing device 101 is a mobile station, then the mobile station can be, but is not limited to, a personal digital assistant (PDA) or a laptop. If the computing device 101 is a base station, then the base station can be, for example, a radio port or an access point.

The computing device 101 comprises a processing device 102, memory 103, one or more user interface devices 104, one or more I/O devices 106, and one or more networking devices 108, each of which is connected to a local interface 110. The processing device 102 can include any custom made or commercially available processor, a central processing unit (CPU) or an auxiliary processor among several processors associated with the computing device 101, a semiconductor based microprocessor (in the form of a microchip), or a macroprocessor. The memory 103 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 104 comprise those components with which the user (e.g., administrator) can interact with the computing device 101. Where the computing device 101 comprises a server computer or similar device, these components can comprise those typically used in conjunction with a PC such as a keyboard and mouse.

The one or more I/O devices 106 comprise components used to facilitate connection of the computing device 101 to other devices and therefore, for instance, comprise one or more serial, parallel, small system interface (SCSI), universal serial bus (USB), or IEEE 1394 (e.g., Firewire™) connection elements. The networking devices 108 comprise the various components used to transmit and/or receive data over a network (not shown), where provided. By way of example, the networking devices 108 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 103 normally comprises various programs (in software and/or firmware) including an operating system (O/S) 112. The O/S 212 controls the execution of programs, including the computing device print manager 214, and provides scheduling, input-output control, file and data management, memory management, and communication control and related services.

Various programs have been described above. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 2:
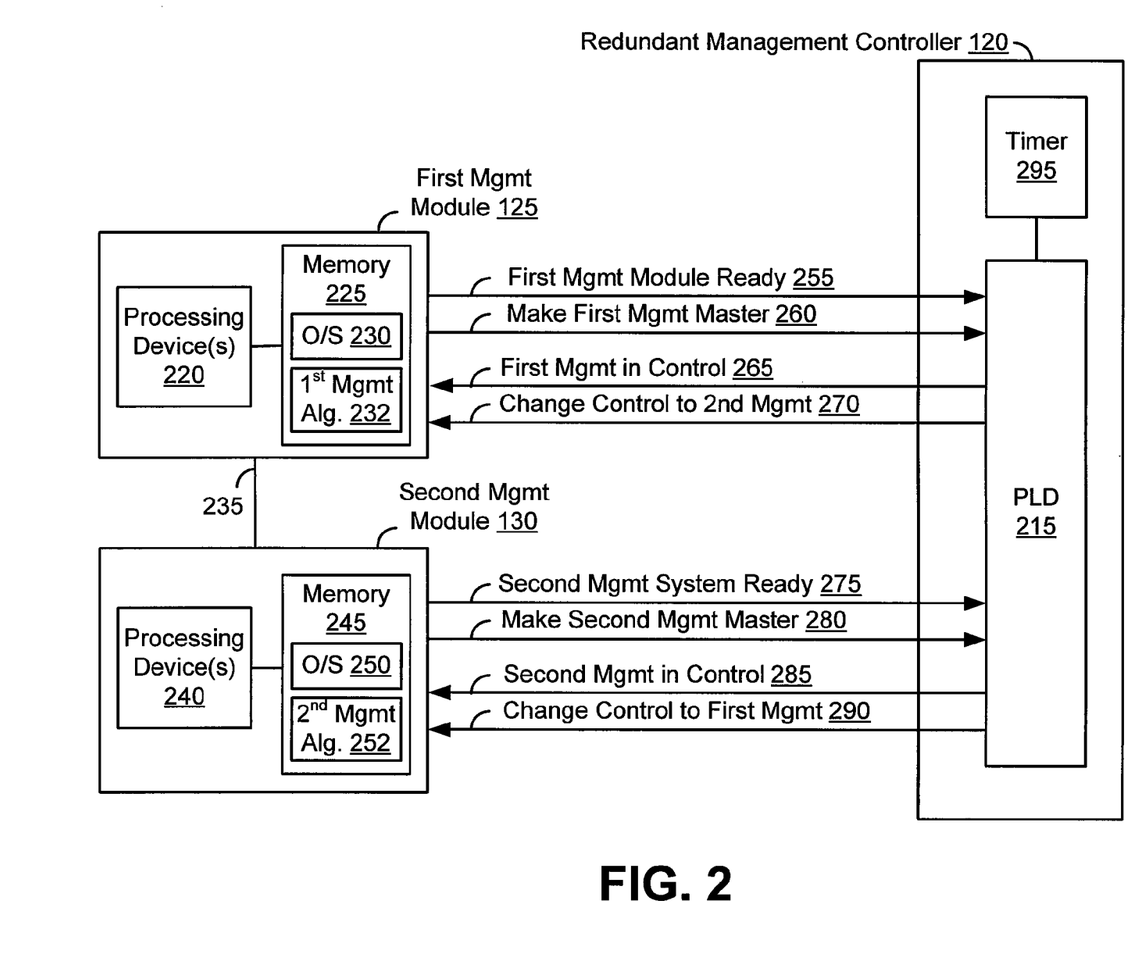
FIG. 2 is a block diagram that illustrates an embodiment of the redundant management module and a redundant management controller, such as that shown in FIG. 1.

FIG. 2 is a block diagram that illustrates an embodiment of the redundant management module 123 and the redundant management controller 120, such as that shown in FIG. 1. The redundant management module 123 includes the first management module 125 and the second management module 130, each comprising one or more processing devices 220, 240 and memory 225, 245, respectively. The processing devices 220, 240 can include any custom made or commercially available processor, a central processing unit (CPU) or an auxiliary processor among several processors associated with the computing device 101, a semiconductor based microprocessor (in the form of a microchip), or a macroprocessor. The memory 225, 245 normally comprises various programs (in software and/or firmware) including an operating system (OS) 230, 250 and first and second management algorithms 232, 252, respectively.

The first and second management modules 125, 130 are electrically coupled to the redundant management controller 120, which includes a programmable logic device (PLD) 215 and a timer 295. The PLD 215 includes a state machine logic that is used as an arbiter to provide a seamless failover system. In generally, the PLD 215 operates in three conditions, which are as follows: boot-up race condition, system stabilized condition, and transition condition.

In general, the PLD 215 during the boot-up race condition is designed to handle the unpredictable boot-up speed of the two independent management modules 125, 130 running with the modules' own set of ROM code in the same chassis. In order to control the boot-up race condition, the PLD 215 configures either the first or second management module 125, 130 to at least temporarily control the computing device 101 (FIG. 1) depending on which management module 125, 130 boots up faster.

For example, if the first management module 125 boots faster, then the first management module 125 can be configured to raise its "ready" signal. The PLD 215 detects the "ready" signal via line 255 from the first management module 125 and instructs the first management module 125 via line 265 to be in a control of the computing device 101. The PLD 215 places the first management module 125 in a state of reset, resulting in the first management module 125 having temporary system control until the PLD 215 determines which management module 125, 130 is a master module and a standby module.

The PLD 215 waits to receive signals from both the first and second management modules 125, 130 that are associated with making either the first or second management module 125, 130 the master module via lines 260, 280 before instructing the computing device 101 to be in system stabilized condition. The PLD 215 in the boot-up race condition can control both management modules 125, 130 and allow both modules 125, 130 to be ready before handing the control of the computing device 101 to the desired management module 125, 130.

After the PLD 215 completes its operation in the boot-up race condition, the PLD 215 goes into the system stabilized condition. After the first and second management modules 125, 130 have booted up and depending on the "ready" and "make_master" signals via lines 255, 275, 260, 280, respectively, the PLD 215 is configured to determine which management module 125, 130 controls the computing device 101. The PLD 215 transmits a "control" signal at lines 265, 285 to either the first or second management module 125, 130, respectively, responsive to the PLD 215 determining which management module 125, 130 controls the computing device 101.

For example, if the PLD 215 determines that the first management module 125 controls the computing device 101 during the system stabilized condition, the PLD 215 transmits the "control" signal via line 265, instructing the first management module 125 to control the computing device 101 based on the first management algorithm 232. The PLD 215 transmits no "control" signal via line 285, resulting in the second management module 130 to be in standby mode. The PLD 215 continues to monitor the first management module 125 under the system stabilized condition until the PLD 215 detects that the system goes into the transition condition.

The PLD 215 goes into the transition condition when the master management module 125, 130 malfunctions or needs to failover and hand over the control to the standby management module 125, 130. In general, the transition condition happens when the master management module 125 drops either "ready" or "make-master" signal. When the redundant management module 123 (FIG. 1) enters into the transition condition, the PLD 215 starts the timer 295 and transmits the "control" signals to both management modules 125, 130 to initialize a failover to take place. Both management modules 125, 130 receive the control signals and perform their final synchronizations with each other. Once the standby management is ready to take control and the timer runs up, the PLD 215 drops the "control" signal to the old master, and the new master management module can take control. The system 100 goes into the system stabilized condition responsive to the new master master management module taking control.

Alternatively or additionally, the PLD 215 associated with the transition condition is configured to temporarily take control of the computing device 101. Alternatively or additionally, the PLD 215 is further configured to instruct both management modules 125, 130 to control the computing device 101 for a short period of time for failover to take place. The PLD 215 completes the transition of control to the standby management module 125, 130 by instructing the master management module 125, 130 to be on standby and the standby management module 125, 130 to be the master via lines 270, 290.

Exemplary systems having been described above, system operation will now be discussed. In the discussions that follow, flow diagrams and state machine logic are provided. Any process steps or blocks in these flow diagrams and state machine logic may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3:
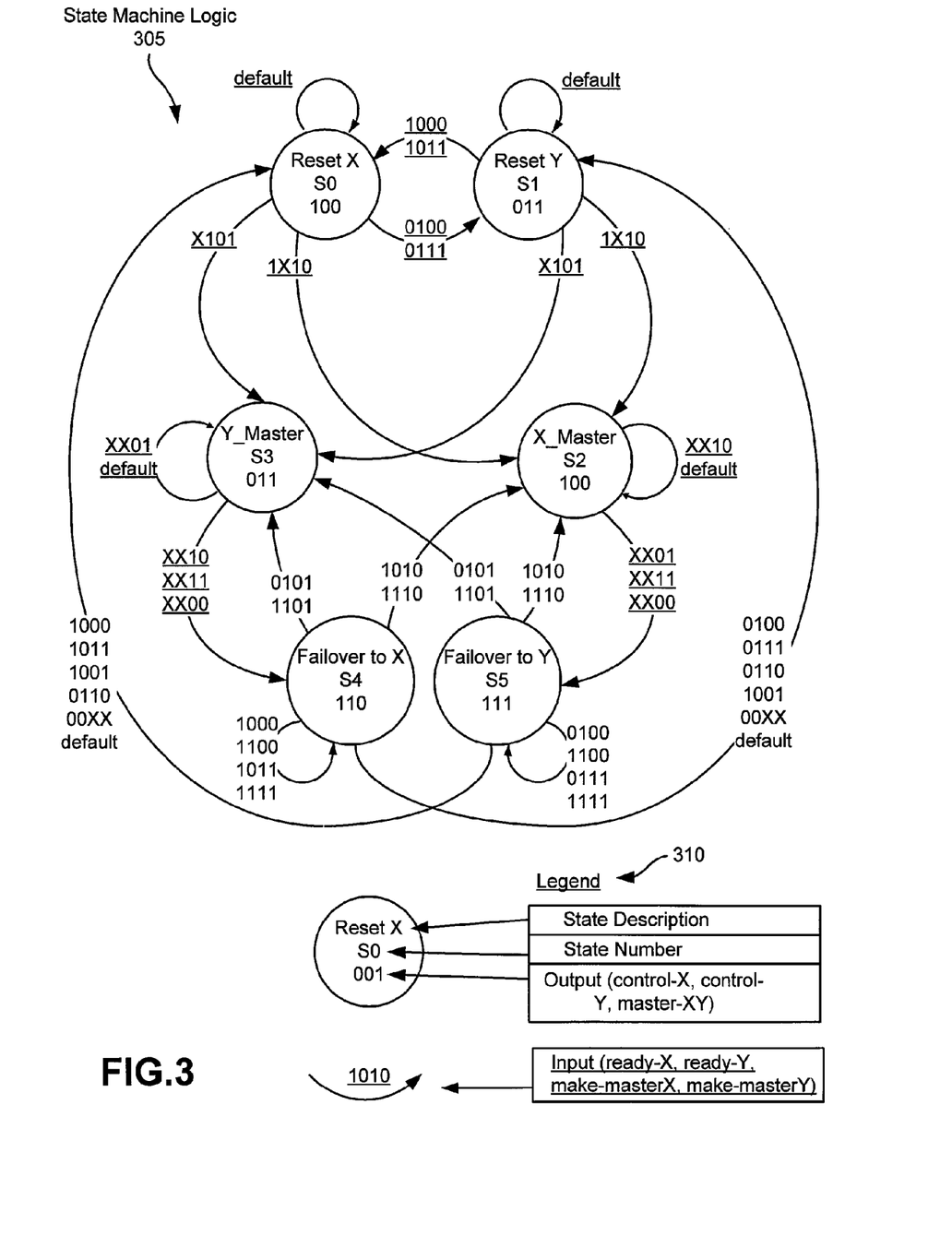
FIG. 3 is a block diagram of a state machine logic for managing the redundant management module, such as that shown in FIG. 1.

FIG. 3 is a block diagram of a state machine logic 305 at the PLD 215 for managing the redundant management module 123, such as that shown in FIG. 1. For simplicity, the first management module 125 is referred to as X and the second management module 130 is referred to as Y. The state machine logic 305 includes three state condition: 1) boot-up race condition, 2) system stabilized condition, and 3) transition condition. The boot-up race condition includes states S0 and S1, entitled "Reset X" and "Reset Y", respectively; the system stabilized condition includes states S2 and S3, entitled "X_Master" and "Y_Master", respectively; and the transition condition includes states S4 and S5, entitled "Failover to X" and "Failover to Y", respectively. It should be noted that the "default" signals at the various states, S0, S1, S2, S3, S4, and S5, are any signals not represented in the state machine logic that are received and triggers the PLD 215 to remain at its respective current state.

Referring to legend 310, each state includes a state description, state number and output (control-X, control-Y, master-XY) signals from the PLD 215 to the X and Y management modules 125, 130. The control-X and control-Y signals allow the X and Y management modules 125, 130 to be master, respectively. The master-XY signal refers to several multiplexers between the X and Y management modules 125, 130. The PLD 215 receives input(ready-X, ready-Y, make-masterX, make-masterY) signals from the X and Y management modules 125, 130, which indicates to the PLD 215 that either the X or Y management modules 125, 130, or both, are ready and available to be master, respectively.

Boot-Up Race Condition at States S0 and S1

At boot-up race condition, the PLD 215 operates in states S0 and S1 entitled, "Reset X" and "Reset Y", respectively. The first and second management modules 125, 130 generally boots up in ROM mode before performing other functions, such as, controlling the computing device 101. Assuming that the X management module 125 boots up before the Y management module, the PLD 215, in state S0, can receive two sets of signals, either "1000" or "1011", and instruct the X management module 125 to have temporary control of the computing device 101 and the Y management module 130 to be on standby by transmitting a "100" signal to the X and Y management modules 125, 130, respectively.

Because the X management module 125 booted up faster, the PLD 215 skips the state S1. However, if the Y management module 130 booted up faster, the PLD 215, in state S1, can receive two sets of signals, either "0100" or "0111", and instruct the Y management module 130 to have temporary control of the computing device 101 and the X management module 125 to be on standby by transmitting a "011" signal to the X and Y management modules 125, 130, respectively.

In general, at the boot-up race condition, depending which management module 125, 130 boots up first, the management module 125, 130 raises its ready and make-master signals. Responsive to receiving the ready and make-master signals, the PLD 215 allows the first-boot-up management module 125, 130 to be master by raising the control signal to the first-boot-up management module 125, 130. The PLD 215 raises the change-control signal 270, 290 to the second-boot-up management 125, 130, which configures itself to remain a standby management module.

System Stabilized Condition at States S2 and S3

At the system stabilized condition and assuming that the X management module 125 is to be master, the PLD 215, in state S2, receives a "1X10" signal and transmits a "100" signal to the X and Y management modules 125, 130, instructing in the X management module 125 to have full control of the computing device 101 and the Y management module 130 to be on standby. Because the PLD 215 selected the X management module 125 to be the master, the PLD 215 skips the state S3. However, if the PLD 215 selected the Y management module 130 to be the master, the PLD 215, in state S3, receives a "X101" signal and transmits a "011" signal to the X and Y management modules 125, 130, instructing in the Y management module 130 to have full control of the computing device 101 and the X management module 125 to be on standby.

Switchover Transition Condition at State S5

When X management module 125 is the master and configured to switch control over to the Y management module 130 during the switchover transition condition in state S5, the PLD 215 goes to state S5, entitled "Failover to Y", responsive to receiving the "XX11" signals from the X and Y management modules 125, 130. At the state S5, the PLD 215 transmits a "111" signal to the X and Y management modules 125, 130, respectively, resulting in the X management module 125 configuring itself into standby mode. Responsive to detecting that the X management module 125 is no longer the master, the PLD 215 goes to state S3 by receiving one of two sets of signals, either "0101" or "1101". Responsive to receiving either "0101" or "1101" signal from the X and Y management modules 125, 130, respectively, the PLD 215 at S3 instructs the Y management module 130 to have full control of the computing device 101 by transmitting a "011" signal to the X and Y management modules 125, 130, respectively. The Y management module 130 starts to take over as the new master. The PLD 215 releases the control-X signal 265 to the X management module 125 after, for example, 16 usec, responsive to detecting that there is an agreement to switch control of the computing device 101 from the X management module 125 to the Y management module 130. The delay is to allow X management module 125 to complete its task before releasing its control signal.

Switchover Transition Condition at State S4

When Y management module 130 is the master and configured to switch control over to the X management module 125 during the switchover transition condition in state S4, the PLD 215 goes to state S4, entitled "Failover to X" responsive to receiving the "XX11" signals from the X and Y management modules 125, 130, respectively. At the state S4, the PLD 215 transmits a "110" signal to the X and Y management modules 125, 130, respectively, resulting in the Y management module 130 configuring itself into standby mode. Responsive to detecting that the Y management module 125 is no longer the master, the PLD 215 goes to state S2 by receiving one of two sets of signals, either "1010" or "1110". Responsive to receiving either "1010" or "1110" signal from the X and Y management modules 125, 130, respectively, the PLD 215 at S2 instructs the X management module 125 to have full control of the computing device 101 by transmitting a "100" signal to the X and Y management modules 125, 130, respectively. The X management module 125 starts to take over as the new master. The PLD 215 releases the control-Y signal 285 to the Y management module 130 after, for example, 16 usec, responsive to detecting that there is an agreement to switch control of the computing device 101 from the Y management module 130 to the X management module 125.

Failover Transition Condition at State S5

When X management module 125 is the master and the X management module 125 fails during the failover transition condition, the PLD 215 goes to state S5 responsive to receiving either "XX01" or "XX00" signal from the X and Y management modules 125, 130, respectively. At S5, the PLD 215 instructs the Y management module 130 to be prepared to control the computing device 101 by transmitting the "111" signal to the X and Y management modules 125, 130, respectively.

Responsive to receiving the transmitted "111" signal from PLD 215, the X and Y management modules 125, 130 transmit either the "0101" or "1101" signal to the PLD 215. Based on receiving either the "0101" or "1101" signal, the PLD 215 at S3 instructs the X management module 125 to be on standby and the Y management module 130 to be the master by transmitting the "011" signal to the X and Y management modules 125, 130, respectively. The Y management module 130 wakes up and takeover as the master. Alternatively or additionally, the PLD 215 can instruct the X management module 125 to be on standby, for example, 16 usec later. Alternatively or additionally, the X management module 125 can be reset without affecting the operation of the rest of the system.

Failover Transition Condition at State S4

When Y management module 130 is the master and the Y management module 130 fails during the failover transition condition, the PLD 215 goes to state S4 responsive to receiving either "XX01" or "XX00" signal from the X and Y management modules 125, 130, respectively. At state S4, the PLD 215 instructs the X management module 125 to be prepared to control the computing device 101 by transmitting the "110" signal to the X and Y management modules 125, 130, respectively.

Responsive to receiving the transmitted "110" signal from PLD 215, the X and Y management modules 125, 130 transmit either the "1010" or "1110" signal to the PLD 215. Based on receiving either the "1010" or "1110" signal, the PLD 215 at S2 instructs the Y management module 130 to be on standby and the X management module 125 to be the master by transmitting the "100" signal to the X and Y management modules 125, 130, respectively. The X management module 125 wakes up and takeover as the master. Alternatively or additionally, the PLD 215 can instruct the Y management module 130 to be on standby, for example, 16 usec later. Alternatively or additionally, the Y management module 130 can be reset without affecting the operation of the rest of the system.

Figure 4:
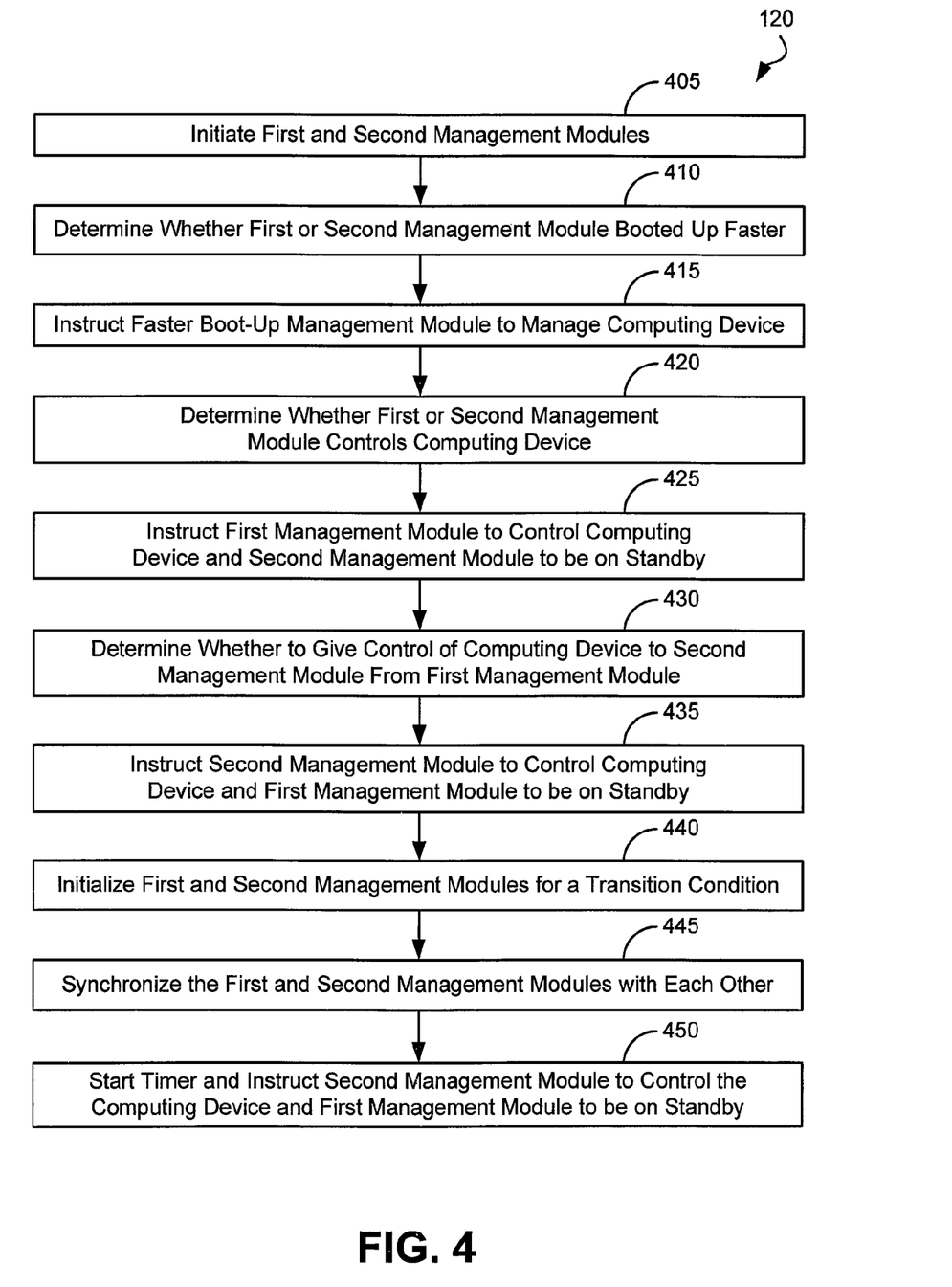
FIG. 4 is a flow diagram that illustrates an embodiment of the architecture, functionality, and/or operation of the redundant management controller, such as that shown in FIG. 1.

FIG. 4 is a flow diagram that illustrates an embodiment of the architecture, functionality, and/or operation of the redundant management controller 120, such as that shown in FIG. 1. In general, a redundant management controller 120 instructs the first management module 125 to manage the computing device responsive to detecting that the first management module 125 is ready to manage the computing device 101 and the second management module 130 to manage the computing device 101 responsive to detecting that the first management module 125 failed to manage the computing device 101.

Beginning with block 405, the system 100 (FIG. 1) initiates the first and second management modules 125, 130. In blocks 410 and 415, a programmable logic device (PLD) 215 determines whether the first or second management module 125, 130 booted up faster and instructs the faster boot-up management module 125, 130 to temporarily manage the computing device 101 responsive to determining the faster boot-up management module 125, 130.

In block 420, the PLD 215 determines whether the first or second management module 125, 130 controls the computing device 101. In block 425, responsive to determining that the first management module 125 controls the computing device 101, the PLD 215 instructs the first management module 125 to control the computing device 101 and the second management module 130 to be on standby. In block 430, the PLD 215 determines whether to give control of the computing device 101 to the second management module 130 from the first management module 125. In block 435, responsive to determining to give control of the computing device 101 to the second management 130, the PLD 215 instructs the second management module 130 to control the computing device 101 and the first management module 125 to be on standby.

In blocks 440 and 445, the PLD 215 initializes both the first and second management modules 125, 130 for a transition condition and synchronizes the first and second management modules 125, 130 with each other responsive to detecting the initialization of the transition condition. In block 450, the PLD 215 starts a timer 295 (FIG. 2), and responsive to determining that the synchronization between the first and second management modules 125, 130 has completed and the timer 295 has ended, instructs the second management module 130 to control the computing device 101 and the first management module 125 to be on standby.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A system for managing a redundant management module comprising:
   first and second management modules that are configured to manage a computing device; and
   a programmable logic device that is configured to control which of said first and second management modules actually manages said computing device, wherein, when transitioning from having the first management module manage the computing device to having the second management module manage the computing device, the programmable logic device being configured to:
      signal both the first management module and second management module to manage the computing device responsive to a determination to transition from having the first management module manage the computing device to having the second management module manage the computing device, and
      when the second management module is ready to manage the computing device, dropping said signal to the first management module to manage the computing device.

2. The system as defined in claim 1, wherein the programmable logic device includes at least one of the following devices: erasable programmable logic device and a field-programmable gate array.

3. The system as defined in claim 1, wherein the programmable logic device further includes state machine logic that handles at least one of the following conditions: boot-up race condition, system stabilized condition, and transition condition.

4. The system as defined in claim 3, wherein the state machine logic associated with the boot-up race condition is configured to handle the unpredictable speed of the first and second management modules, the state machine logic being configured to handle the unpredictable speed by way of:
   determining whether the first or second management module booted up faster, and
   responsive to determining the faster boot-up management module, instructing the faster boot-up management module to temporarily manage the computing device.

5. The system as defined in claim 4, wherein the state machine logic associated with the system stabilized condition is configured to:
   determine whether the first or second management module controls the computing device, and
   responsive to determining that the first management module controls the computing device, instruct the first management module to control the computing device and instruct the second management module to be on standby.

6. The system as defined in claim 5, wherein the state machine logic associated with the transition condition is configured to:
   determine whether to give control of the computing device to the second management module from the first management module, and
   responsive to determining to give control of the computing device to the second management module, instruct the second management module to control the computing device and the first management module to be on standby.

7. The system as defined in claim 6, wherein the state machine logic includes a timer that facilitates the state machine logic to give control from the first management module to the second management module, responsive to determining to give control of the computing device to the second management, the state machine logic being further configured to:
   start the timer;
   initialize both the first and second management modules for the transition condition, the first and second management modules being configured to perform their respective synchronization with each other responsive to detecting the initialization of the transition condition; and
   responsive to determining that the synchronization between the first and second management modules has completed and the timer has ended, instruct the second management module to control the computing device and instruct the first management module to be on standby.

8. A redundant management module comprising:
   a programmable logic device that is configured to:
      instruct a first management module to manage a computing device responsive to detecting that the first management module is ready to manage the computing device, and
      instruct a second management module to manage the computing device responsive to detecting that the first management module failed to manage the computing device;
      wherein the programmable logic device is further configured to itself temporarily take over management of the computing device from the first and second management modules.

9. The redundant management module as defined in claim 8, wherein the programmable logic device includes at least one of the following devices:
   erasable programmable logic device and a field-programmable gate array.

10. A redundant management module comprising:
   a programmable logic device comprising state machine logic that is configured to control which of a first management module and second management module manages a computing device:
   where the programmable logic device is configured to, upon boot up of the first and second management modules,
      determine whether the first or second management module boots up faster to determine which is a faster boot-up management module, and
      responsive to determining the faster boot-up management module, instructing the faster boot-up management module to temporarily manage the computing device
   wherein the state machine logic includes a timer that facilitates the state machine logic to give control from the first management module to the second management module responsive to a determination to give control of the computing device to the second management, the state machine logic being further configured to:
   start the timer;
   initialize both the first and second management modules for a transition condition, the first and second management modules being configured to perform respective synchronization with each other responsive to detecting initialization of the transition condition; and responsive to determining that the synchronization between the first and second management modules has completed and the timer has ended, instruct the second management module to control the computing device and the first management module to be on standby.

11. The redundant management module as defined in claim 10, wherein the state machine logic handles at least one of the following conditions: boot-up race condition, system stabilized condition, and transition condition.

12. The redundant management module as defined in claim 11, wherein the state machine logic associated with the system stabilized condition is configured to:

determine whether the first or second management module controls the computing device, and responsive to determining that the first management module controls the computing device, instruct the first management module to control the computing device and the second management module to be on standby.

13. The redundant management module as defined in claim 12, wherein the state machine logic associated with the transition condition is configured to:

determine whether to give control of the computing device to the second management module from the first management module, and responsive to determining to give control of the computing device to the second management, instruct the second management module to control the computing device and the first management module to be on standby.

14. A method for managing a redundant management module comprising:

initiating first and second management modules;

instructing the first management module by a programmable logic device to manage a computing device responsive to detecting that the first management module is ready to manage the computing device;

upon detecting that the first management module failed to manage the computing device, instructing both the first and second management modules to manage the computing device until the second management module is ready to manage the computing device; and then terminating instruction to the first management module to manage the computing device.

15. The method as defined in claim 14, further comprising:

determining by the programmable logic device whether the first or second management module booted up faster; and responsive to determining the faster boot-up management module, instructing the faster boot-up management module by the programmable logic device to temporarily manage the computing device.

16. The method as defined in claim 14, wherein detecting that the first management module failed to manage the computing device comprises detecting that the first management module has dropped a signal to the programmable logic device indicating that the first management module is prepared to manage the computing device.

17. The method as defined in claim 16, further comprising:

determining by the programmable logic device whether to give control of the computing device to the second management module from the first management module;

responsive to determining to give control of the computing device to the second management, instructing the second management module by the programmable logic device to control the computing device and the first management module to be on standby.

18. The method as defined in claim 17, further comprising:

initializing both the first and second management modules for a transition condition; and synchronizing the first and second management modules with each other responsive to detecting the initialization of the transition condition.

19. The method as defined in claim 18, further comprising:

starting a timer; and responsive to determining that the synchronization between the first and second management modules has completed and the timer has ended, instructing the second management module by the programmable logic device to control the computing device and the first management module to be on standby.

* * * * *